United States Patent [19]

Takahashi

[11] Patent Number: 4,601,355
[45] Date of Patent: Jul. 22, 1986

[54] ELECTRONIC WEIGHER

[75] Inventor: Naoki Takahashi, Kyoto, Japan

[73] Assignee: Kabushiki Kaisha Ishida Koki Seisakusho, Kyoto, Japan

[21] Appl. No.: 646,089

[22] Filed: Aug. 31, 1984

[30] Foreign Application Priority Data

Aug. 31, 1983 [JP] Japan ............................ 58-135761[U]

[51] Int. Cl.⁴ ..................... G01G 23/38; G01G 23/00; G06F 15/20
[52] U.S. Cl. ........................................ 177/2; 177/128; 364/189; 364/466
[58] Field of Search ..................... 177/2–13, 177/128; 364/189, 466; 235/383

[56] References Cited

U.S. PATENT DOCUMENTS

| | | | |
|---|---|---|---|
| 3,104,806 | 9/1963 | Allen | 364/466 X |
| 4,398,253 | 8/1983 | Karp et al. | 177/4 X |
| 4,430,716 | 2/1984 | Dlugos et al. | 364/466 |
| 4,528,623 | 7/1985 | Tachibana | 364/189 X |

FOREIGN PATENT DOCUMENTS

| | | |
|---|---|---|
| 0020920 | 1/1981 | European Pat. Off. . |
| 0064341 | 11/1982 | European Pat. Off. . |
| 0081815 | 6/1983 | European Pat. Off. . |
| 0087310 | 8/1983 | European Pat. Off. . |

OTHER PUBLICATIONS

European Search Report.

*Primary Examiner*—George H. Miller, Jr.
*Attorney, Agent, or Firm*—Staas & Halsey

[57] ABSTRACT

An electronic weigher in which, when a commodity is weighed, commodity data are called from memory by pressing a preset key and are utilized by a display or printer, and in which at least the weight and price of the commodity are displayed. Disposed at the side of the weigher body is a keyboard having a plurality of preset keys for reading out the commodity data. The keyboard, which is rotatably connected to the weigher body by a connecting shaft, can be erected and reclined about the connecting shaft and disconnected from the weigher body when necessary.

9 Claims, 4 Drawing Figures

ELECTRONIC WEIGHER

BACKGROUND OF THE INVENTION

This invention relates to an electronic weigher, particularly an electronic weigher for storing commodity data such as unit price and tare and for displaying and-/or printing out the commodity data by calling the data through operation of preset keys.

In general, an electronic weigher is adapted to store commodity data entered beforehand by numeric keys or the like, which data include the unit price and tare of a variety of commodities. When a weighing operation is performed, the operator enters a call number in response to which the electronic weigher calls the necessary data from among the stored data and displays the unit price, total price, etc., together with the weight of the particular commodity, on a display unit of the electronic weigher. Many electronic weighers are provided with a printer for issuing a label on which such data as the commodity name and the date are printed in addition to the aforementioned commodity data.

Electronic weighers of the above-described type are provided with a control panel having numeric keys for entering the aforementioned commodity data, and various function keys for registering and calling the commodity data. In the conventional electronic weighers of this kind, a call number consisting of a plurality of digits is substituted for each item of commodity data such as the commodity name or unit price. The call number then is entered by the numeric keys on the control panel and a function key is pressed to register or call the relevant item of commodity data. The operator must therefore go to the trouble of memorizing the call number for each commodity name or the like or of consulting a table each time. In addition, to call even one item of commodity data, the operator must press a key or keys a number of times which is at least equivalent to the number of digits in the call number.

In an attempt to solve the foregoing problem, the control panels of some electronic weighers come equipped with so-called "preset" keys, on each of which the name of the commodity is written, in addition to the numeric keys and function keys. This enables an item of commodity data to be called by operating the corresponding preset key instead of entering the call number through use of the numeric keys. This arrangement eliminates the bother of memorizing the call numbers or of referring to a table and greatly facilitates operation by reducing the number of times keys must be pressed. On the other hand, a large number of preset keys must be provided in order to deal with a large number of commodities. This results in a control panel of larger size and, hence, in a larger electronic weigher. Moreover, in cases where the commodities dealt with are comparatively few in number, no particular inconvenience is encountered in keying in the call number each time as in the conventional manner. In such case the preset keys are unnecessary.

SUMMARY OF THE INVENTION

An object of the present invention is to provide an electronic weigher adapted so that preset keys can be mounted on the weigher when necessary without increasing the size of the weigher.

According to the present invention, the foregoing object is attained by providing an electronic weigher having a weigher body incorporating a weighing apparatus, a weighing platform provided at the upper portion of the weigher body, a control panel and display section provided on the outer side of the weigher body, and a keyboard, provided with a plurality of preset keys, disposed at the side of the weigher body and adapted so as to be attachable to and detachable from the weigher body. The keyboard is rotatably attached at its lower portion to the weigher body via a connecting shaft, and means are provided for rotating the keyboard to a desired erect attitude about the connecting shaft and for holding the keyboard in the desired erect attitude.

When calling commodity data by entering call numbers from the control panel is troublesome, the keyboard may be attached to the weigher body and the preset keys thereof employed instead of the keys on the control panel to reduce the number of key operations and simplify the operator's task. Since the keyboard is detachable from the weigher body, there is no increase in the size of the weigher body itself. In cases where it is not required to use the preset keys, the keyboard can be detached from the weigher body so that the weigher need not be equipped with the keyboard unnecessarily. Further, since the keyboard can be held erect in a desired attitude, the operator may choose the keyboard attitude which is most suitable.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1 through 4 illustrate a preferred embodiment of an electronic weigher according to the present invention, in which FIG. 1 is a perspective view of the overall electronic weigher and shows a keyboard in an erect attitude, FIG. 2 is an enlarged bottom view of a principal portion of the electronic weigher, FIG. 3 is a sectional view taken along line III—III of FIG. 2, and FIG. 4 is a perspective view of the overall electronic weigher and shows the keyboard in a reclined attitude.

DESCRIPTION OF THE PREFERRED EMBODIMENT

Figure 1:
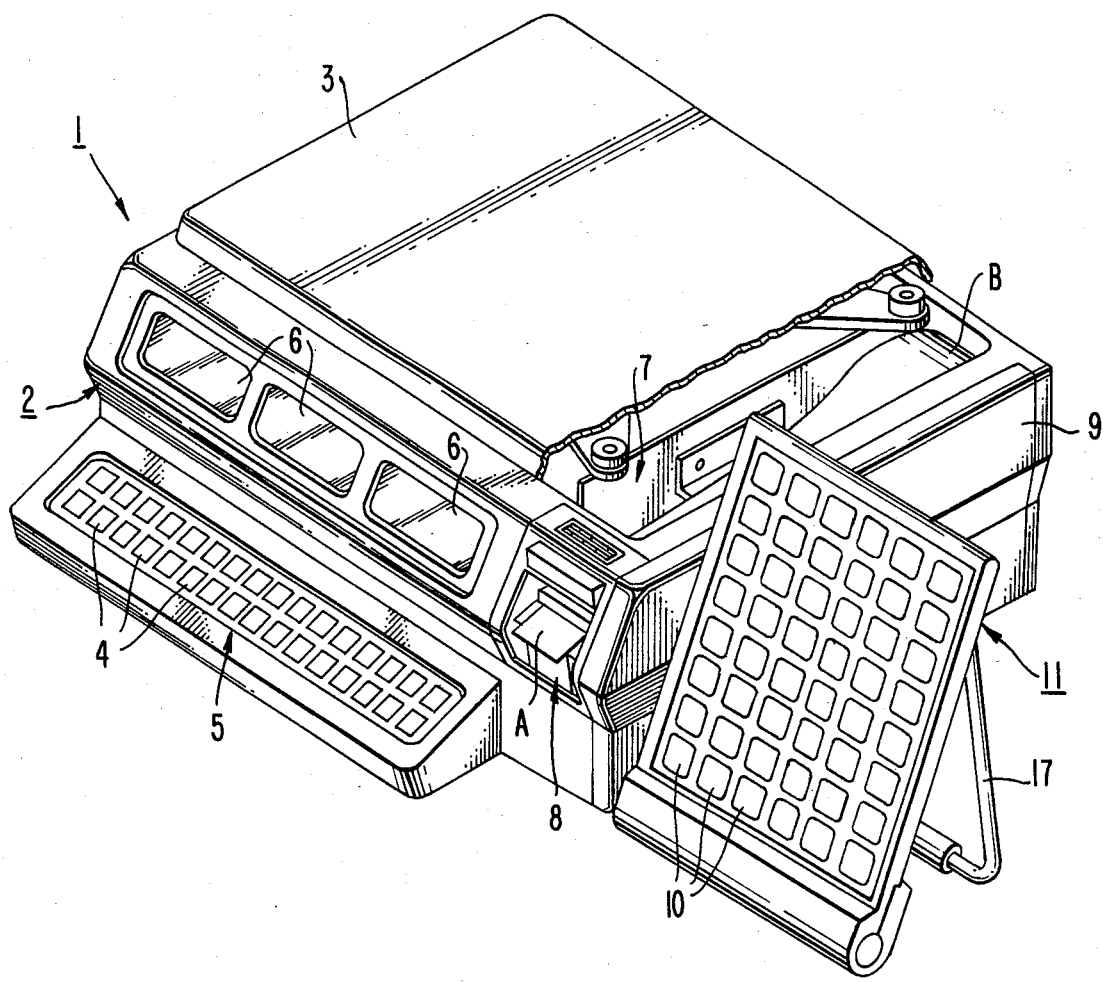

With reference first to FIG. 1, an electronic weigher 1 has a body 2 on the upper portion of which is mounted a weighing platform 3 for receiving a commodity to be weighed. Accommodated within the body 2 are a weight sensor (not shown) such as a load cell for sensing the weight of a commodity placed upon the weighing platform 3, a weighing apparatus (not shown) comprising a memory and a control unit for processing a signal indicative of the commodity weight and produced as an output by the weight sensor, and a label printer 7 controlled by the control unit. Provided on the front side of the body 2 at the lower portion thereof is a control panel 5 having an array of various keys 4 . . . 4 such as numeric keys and function keys used for operating the electronic weigher 1 and for entering data. Provided on the front side of the body 2 at the upper portion thereof are display sections 6 . . . 6 for digitally displaying, e.g., the unit price, weight and total price of the commodity being weighed. In order to make the information displayed on the display sections 6 . . . 6 visible to the customer, display sections identical with the display sections 6 . . . 6 are provided on the back side of the body 2, namely on the side facing the customer. It should be noted that the items displayed are not limited to those mentioned. Arrangements are possible in which additional items are displayed, or in which solely the weight of the commodity is displayed.

Provided on one side of the body 2 at the front thereof is a label extraction window 8 from which a label A, printed and issued by the label printer 7, is fed out. This side of the body 2 is equipped with a removable cover 9 which, when installing a roll of label paper B for the printer 7, is removed from the body 2 to open the side thereof.

Numeral 11 denotes a keyboard attached to the electronic weigher 1 on the side thereof at which the printer 7 is disposed. The front side of the keyboard 11 is equipped with a number of preset keys 10 . . . 10, each of which has a commodity name indicated thereon. Pressing any one of the preset keys 10 enters a commodity number corresponding to the commodity name into the control unit of the weighing apparatus. Already stored within the internal memory of the weighing apparatus are the commodity number and the corresponding commodity data, such as the commodity name, unit price and tare. When the commodity number is fed into the control unit of the weighing apparatus by pressing the preset key 10, the commodity data corresponding to the commodity number are read out of the memory.

The structure for attaching the keyboard 11 to the body 2 of the electronic weigher 1 will now be described with reference to FIGS. 2 through 4.

Figure 2:
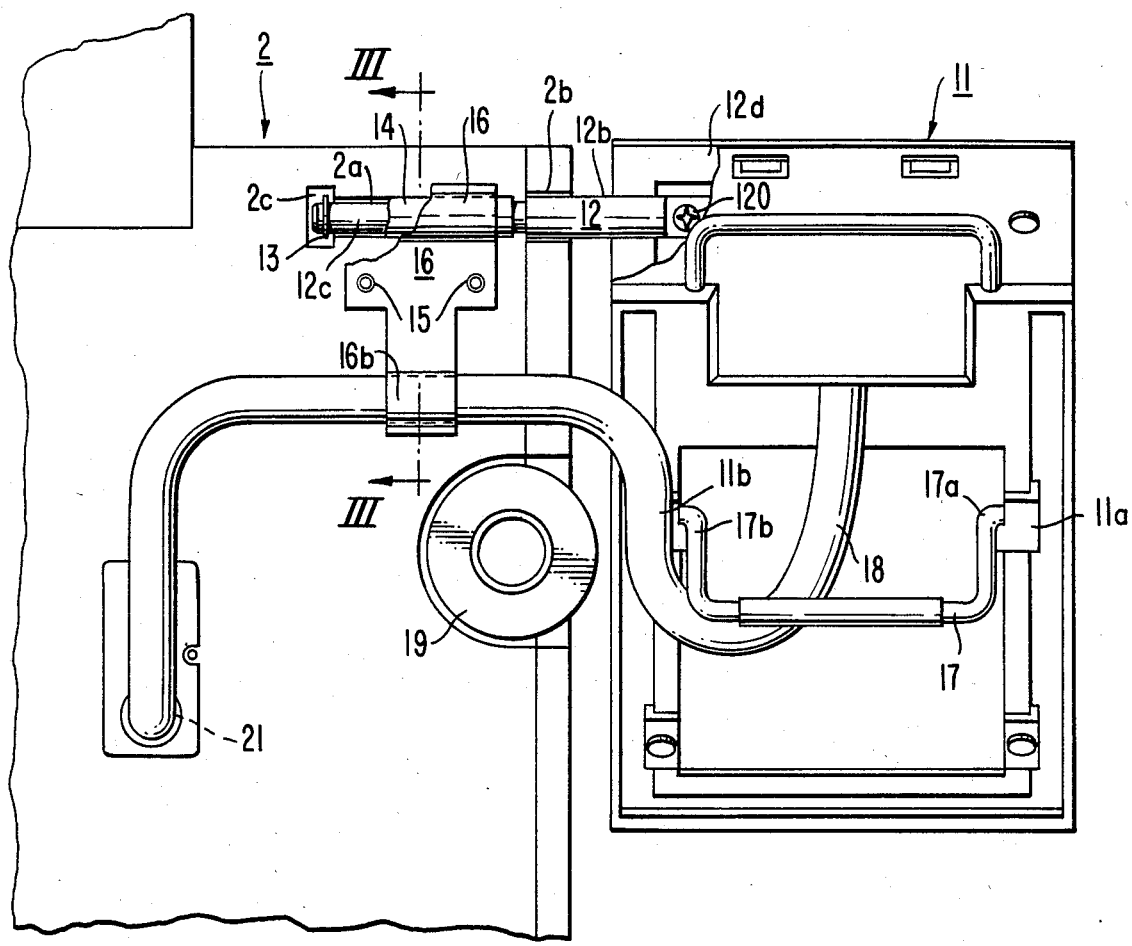
Figure 3:
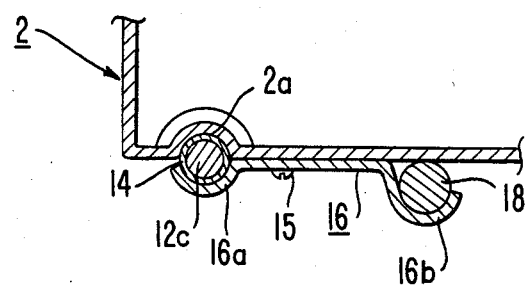
Figure 4:
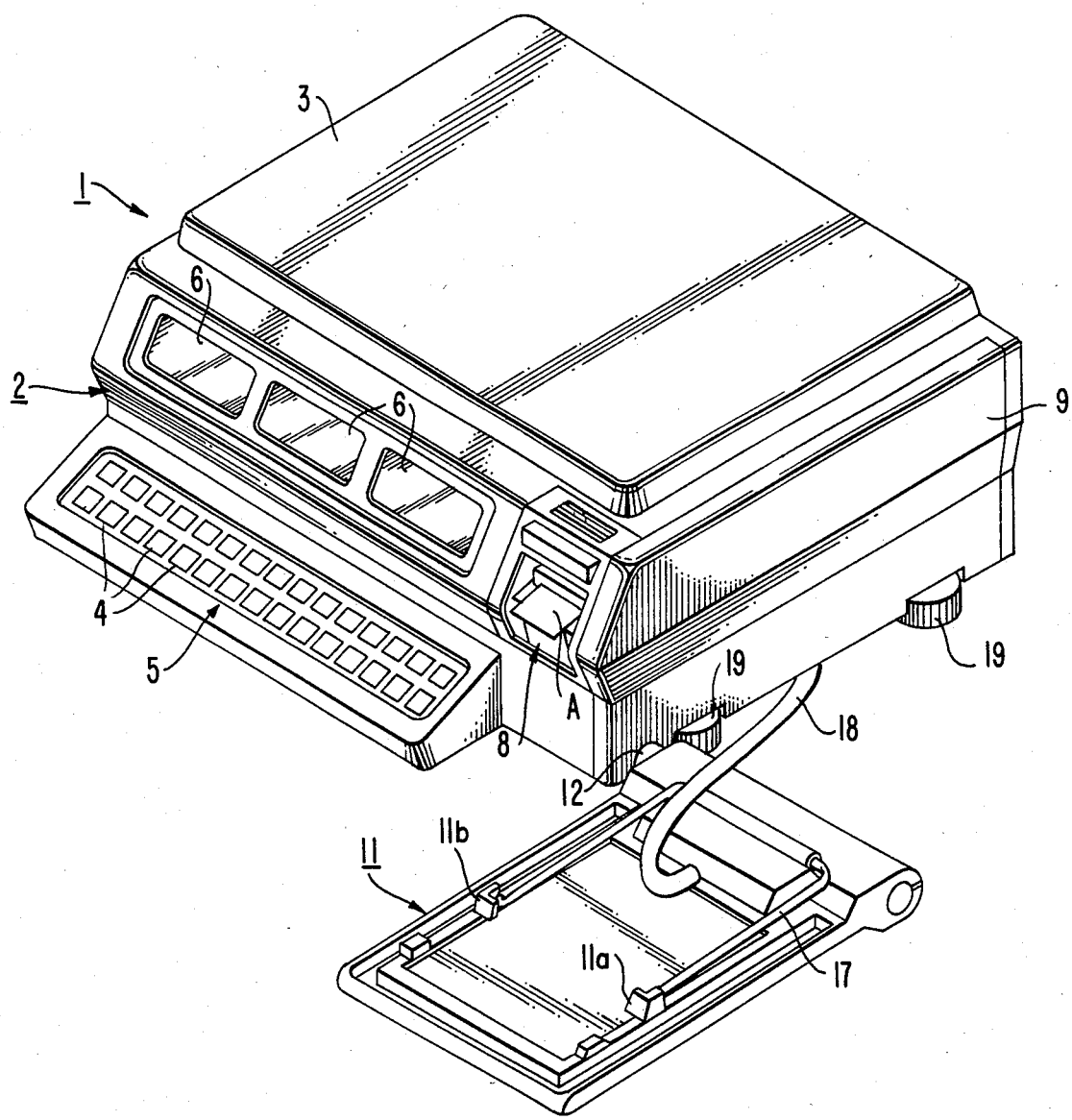

FIG. 2 is a bottom view showing the keyboard 11 in the erected attitude, FIG. 3 is a sectional view taken along line III—III of FIG. 2, and FIG. 4 is a perspective view showing the keyboard 11 in a forwardly reclined attitude.

In FIGS. 2 through 4, a connecting shaft 12 for connecting the keyboard 11 to the body 2 of the electronic weigher 1 comprises a first end portion 12a formed to have a flat cross-section, an intermediate portion 12b connected to the first end portion 12a and formed to have a circular cross-section, and a second end portion 12c connected to the intermediate portion 12b and formed to have a circular cross-section of a diameter smaller than that of the intermediate portion. The first end portion 12a of the connecting shaft 12 is attached as by a screw 120 to the lower end portion of the rear side of the keyboard 11. Fitted rotatably on the second end portion 12c of the connecting shaft is a sleeve 14. Also fitted on the second end portion 12c is a retaining ring 13 which prevents the sleeve 14 from slipping off the shaft 12.

Formed in the bottom of the body 2 of the weigher at the front portion thereof are a recess 2a having a semicircular cross-section corresponding to the outer circumferential surface of the sleeve 14, a recess 2b having a semicircular cross-section of a diameter larger than that of the central portion 12b of the connecting shaft 12 for receiving the intermediate portion 12b without contact, and a recess 2c for receiving the retaining ring 13. Thus, the sleeve 14, the intermediate portion 12b of the connecting shaft 12 and the retaining ring 2c are fitted into the recesses 2a, 2b, 2c, respectively.

A holding member 16 is secured to the bottom side of the body 2 by screws 15. The holding member 16 includes at one thereof a sleeve holding portion 16a having an arcuate surface corresponding to the outer circumferential surface of the sleeve 14, and at the other end thereof a cord holding portion 16b. The connecting shaft 12 is rotatably attached to the body 2 of the electronic weigher 1 via the sleeve 14 by bringing the arcuate surface of the sleeve holding portion 16a into abutting contact with the outer circumferential surface of the sleeve 14 fitted in the recess 2a and securing the holding member 16 to the body 2 by the screws 15 as mentioned above. As a result, the keyboard 11, which is securely attached to the first end portion 12a of the connecting shaft 12 as described above, is attached to the body 2 so as to be swingable back and forth about the connecting shaft 12.

A crank-shaped stand 17 has end portions 17a, 17b which are pivotally supported by respective brackets 11a, 11b mounted on the rear side of the keyboard 11. The stand 17 allows the keyboard 11 to be rotated about the connecting shaft 12 and held erect in a suitable attitude.

Numeral 18 denotes an electric cord extending from the rear side of the keyboard 11 and having its intermediate portion anchored by the cord holding portion 16b of the holding member 16. The cord 18 is inserted into the body 2 of the electronic weigher 1 through a cord insertion hole 21 formed in the bottom of the body 2.

Legs 19 . . . 19 which are adjustable in height are attached to the bottom side of the body 2. The legs 19 . . . 19 allow a clearance to be provided between the bottom surface of the body 2 and the surface on which the electronic weigher 1 is installed so that the weigher may be set up without obstruction ascribable to the connecting shaft 12, holding member 16 and electric cord 18.

The operation of the electronic weigher 1 having the foregoing construction will now be described.

When the keyboard 11 is to be used, the operator sets the stand 17 attached to the back of the keyboard 11 to a desired angle of inclination relative to the keyboard so that the same may be brought to an erect attitude, as shown in FIG. 1. This makes it possible for the operator to use preset keys 10 . . . 10 provided on the front side of the keyboard 11. A sheet having a commodity name, written thereon it, corresponding to said call number is interchangeably attached to each of the preset keys 10 on said key board 11 and then the sheet can be easily exchanged with another sheet having a different commodity name when said commodity name is changed. When a weighing operation is performed, one of the preset keys 10 having the name of the desired commodity written thereon is pressed, in response to which commodity data such as the unit price and tare already registered with regard to the relevant call number are called from the memory of the weighing apparatus. Based on the commodity data, the printer 7 within the weigher body 2 prints out on the label A the net weight of the commodity placed on the weighing platform 3, the unit price thereof, the total price calculated from the net weight and the unit price, the name of the commodity, and any other information desired. The label A emerges from the window 8 at the front of the body 2. At this time, the net weight, unit price and total price are displayed in the display sections 6 . . . 6 provided on the front of the weigher body 2, and in the display sections (not shown) provided on the back of the weigher body.

When it is desired to register a commodity name, unit price and tare with respect to a call number, the operator goes to the keyboard 11 and presses the preset key 10 bearing the name of the particular commodity, and then presses the keys 4 on the control panel 5 of the weigher body 2. This registers the name of the commodity, its unit price, etc.

In the illustrated embodiment, the keyboard 11 is disposed on the same side as the printer 7 and might be expected to impede the loading of the label paper B. However, since the keyboard 11 is connected to the body 2 via the connecting shaft 12 and is capable of being rotated about the shaft 12, the keyboard 11 can be reclined forwardly of the weigher, as shown in FIG. 4, and the stand 17 can be folded into the rear side of the keyboard, as shown in the same figure. This enables the cover 9 on the same side of the weigher body 2 to be opened without obstruction to allow easy loading of the label paper B.

Since the keyboard 11 is detachable from the body 2, it can be removed when use thereof is not required. More specifically, by loosening the screws 15, 15 shown in FIGS. 2 and 3 and either detaching the holding member 16 or removing the retaining ring 13 attached to the second end portion 2c of the connecting shaft 12, followed by pulling out the electric cord 18 from the interior of the weigher body 2, the keyboard 11 can be separated completely from the body 2. This makes it possible to employ the keyboard 11 as an optional component. In other words, the keyboard 11 need not be purchased unnecessarily in cases where it is not required to call commodity data by operating the preset keys during a weighing operation, namely in cases where data are called by entering call numbers through use solely of the numeric keys 4 . . . 4 on the control panel 5 of the weigher body 2.

The keyboard 11 ordinarily is attached or detached by the dealer when so requested by the user, or by the manufacturer prior to shipping as set forth in the specifications concerned. However, if the electronic weigher is manufactured in such a manner that the electric cord 18 connecting the keyboard 11 and weigher body 2 can be readily attached to and detached from the body 2 as by providing a plug and receptacle, then even the user will be able to connect and disconnect the keyboard 11 and weigher body 2 as required.

It should be noted that the electronic weigher of the present invention is not limited to one having a printer, as in the illustrated embodiment. The invention is applicable to electronic weighers which do not come equipped with a printer.

As many apparently widely different embodiments of the present invention can be made without departing from the spirit and scope thereof, it is to be understood that the invention is not limited to the specific embodiments thereof except as defined in the appended claims.

What I claim is:

1. An electronic weigher of the type in which commodity data is read out of a memory by using preset keys when a commodity is weighed, and in which at least the weight value of the weighed commodity is displayed, comprising:
    a body;
    a weighing platform on said body on which a commodity is placed when being weighed;
    a control panel having a plurality of keys on said body;
    a display section on said body for displaying at least the weight value of the weighed commodity;
    a connecting shaft attached to said body; and
    a separate keyboard having a plurality of preset keys and attached to said body via said connecting shaft, said keyboard being detachable from said body.

2. An electronic weigher of the type in which commodity data is read out of a memory by using preset keys when a commodity is weighed, and in which at least the weight value of the weighed commodity is displayed, comprising:
    a body;
    a weighing platform on said body on which a commodity is placed when being weighed;
    a control panel having a plurality of keys on said body;
    a display section on said body for displaying at least the weight value of the weighed commodity;
    a printer for printing out at least the weight value of the weighed commodity;
    a connecting shaft rotatably attached to said body;
    a separate keyboard having a plurality of preset keys and rotatably attached to said body via said connecting shaft, said keyboard being detachable from said body; and
    means for rotating said keyboard to a desired erect attitude about said connecting shaft and for holding said keyboard in the desired erect attitude.

3. The electronic weigher according to claim 2, wherein said keyboard is provided at a side of said printer.

4. The electronic weigher according to claim 2, wherein said means comprises a crank-shaped stand member having first and second end portions pivotally attached to the rear side of said keyboard.

5. The electronic weigher according to claim 2, wherein a cord electrically connects said keyboard to said weigher body, said cord being detachably connected to said body.

6. The electronic weigher according to claim 2, wherein vertically, adjustable legs are provided on said body.

7. An electronic weigher of the type in which commodity data is read out of a memory by using preset keys when a commodity is weighed, and in which at least the weight value of the weighed commodity is displayed, comprising:
    a body;
    a weighing platform on said body on which a commodity is placed when being weighed;
    a control panel having a plurality of keys on said body;
    a display section on said body for displaying at least the weight value of the weighed commodity;
    a printer mounted inside said body for printing out at least the weight value of the weighed commodity;
    a removable cover on said body to permit access to said printer;
    a connecting shaft rotatably attached to said body;
    a separate keyboard having a plurality of preset keys and rotatably attached to said body via said connecting shaft, said keyboard being detachable from said body; and
    means for rotating said keyboard to a desired erect attitude about said connecting shaft and for holding said keyboard in the desired erect attitude.

8. The electronic weigher according to claim 7, wherein a cord electrically connects said keyboard to said weigher body said cord being detachably connected to said body.

9. The electronic weigher according to claim 7, wherein vertically, adjustable legs are provided on said body.

* * * * *